(12) United States Patent
Ilani

(10) Patent No.: US 6,341,298 B1
(45) Date of Patent: Jan. 22, 2002

(54) SIGNAL EQUALIZATION

(75) Inventor: Yishai Ilani, Dolev (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/272,649

(22) Filed: Mar. 18, 1999

(30) Foreign Application Priority Data

Mar. 22, 1998 (IL) ................................................. 123782

(51) Int. Cl.[7] .............................. G06F 7/32; G06F 17/10
(52) U.S. Cl. ..................................... 708/520; 708/323
(58) Field of Search .......................... 708/520, 322–323

(56) References Cited

U.S. PATENT DOCUMENTS

| | | | |
|---|---|---|---|
| 5,285,474 A | | 2/1994 | Chow et al. |
| 5,319,586 A | * | 6/1994 | Gupta et al. ................. 708/520 |
| 5,461,640 A | | 10/1995 | Gatherer |
| 5,870,432 A | * | 2/1999 | Kerckhove .................. 708/323 |
| 6,002,716 A | * | 12/1999 | Meyer et al. ................ 708/323 |
| 6,151,358 A | * | 11/2000 | Lee et al. ................... 708/323 |

OTHER PUBLICATIONS

"Fundamentals of Matrix Computations", by D.S. Watkins, John Wiley & Sons, 1991, pp. 136–159, 166–183, 210–225.

* cited by examiner

Primary Examiner—Tan V. Mai
(74) Attorney, Agent, or Firm—Rosenman & Colin LLP

(57) ABSTRACT

A method, in a data transmission system, for optimizing an equalizer used to equalize a signal transmitted through a distorting channel, where the method comprises the calculation of a maximal projection from one subspace of a vector space upon another subspace of that vector space. These projections may be carried in either direction, and the preferred direction from which subspace should the projection be carried out, is determined from the dimension of each of the two subspaces.

23 Claims, 3 Drawing Sheets

SIGNAL EQUALIZATION

FIELD OF THE INVENTION

The present invention relates to the transmission and reception of signals, and more particularly, to methods and apparatus for optimizing the equalization of a signal that has been transmitted through a distorting medium.

BACKGROUND OF THE INVENTION

Modern modems, and in particular ADSL modems with a DMT line code, generally employ block-based modulation to transmit data across a twisted pair. In such systems equalization of the received signal is necessary to ensure that as much of the energy of the overall impulse response as possible is contained in a fixed number of symbol periods, called the cyclic prefix of the system. The equalization process is typically performed in two stages, the initial stage and the steady state. In the initial stage, a predetermined signal is transmitted in order to study the impulse response of the transmission channel and determine the equalizing coefficients. In the steady state, any signal may be transmitted, and the equalization coefficients are applied as a finite impulse response (FIR) filter to the signal received by the receiver.

While steady state operation is straightforward, determining the equalization coefficients, also referred to as "equalizing the channel," is less so. Proposed methods for determining the equalizing coefficients in a DMT system are either computationally complex, and therefore require an enormous amount of computer memory and processing time in order to implement them, or they suffer from inaccuracies due to non-optimized algorithms or due to computational roundoff errors that arise when performing operations such as division on a DSP.

Methods of the prior art generally comprise two major parts:

Preparing the parameters for the algorithm, including computation of auto-correlation and cross-correlation matrices; and Iteratively performing computations on a certain range of delays in order to find an optimum delay such that the overall signal contained in the corresponding response region will have maximal energy.

Most of the computational effort is generally required for the iterative computations as the preparation is performed only once.

U.S. Pat. No. 5,461,640 describes a method where the auto-correlations and cross-correlations are computed during the parameter preparation part. U.S. Pat. No. 5,461,640 is disadvantageous in that it presents computational complexities, discussed hereinbelow, that might be avoided during the iterative computation part were another method used during the parameter preparation part.

To understand the equalization problem we may denote an input signal $x_k$, an output signal $y_k$, a channel response by h, and equalizer taps w. Thus the overall response of the channel may be expressed as:

$$h = h * w,$$

We may further denote $\tilde{b}$ as the ideal overall response which is equivalent to the overall response $\tilde{h}$ in the response region, and zero outside the response region, and denote b as the filter which is the non-zero portion of the ideal overall response $\tilde{b}$.

Two prior art approaches are now described.

1. In one approach, methods used for optimization of decision feedback equalization (DFE) are employed, where the equalizer taps w is the forward filter, and the filter b is the feedback filter. The only difference is that in the DMT case b does not have to be monic and causal. That is, the first tap does not have to be constrained to unity. The following algorithm is proposed:

a) Estimate the cross-correlation between the channel input $x_k$, and the channel output $y_k$, and the auto-correlation of the output $y_k$.

b) For delay $\Delta = \Delta_{min}$ to $\Delta_{max}$ for i=1 to v
   (i) Constrain the i-th tap of b to be unity
   (ii)

$$\text{minimize} \|\tilde{b} - \tilde{h}\|^2$$

using the DFE minimization techniques.

c) Choose the minimum of all the solutions found.

2. Another approach, such as is described in U.S. Pat. No. 5,461,640, tries to minimize the ratio of the energy in the output of the ideal response filter to the energy in the output of the overall response filter that is outside the response region. This is accomplished by applying a constraint of the form:

$$\|b\|^2 = 1,$$

where b has a length v, and minimizing $$z^T R_{uu} z$$

where $R_{uu}$ is a matrix comprising the auto-correlations of the inputs $x_k$, the outputs of the channel $y_k$, and the cross-correlations between them, and z is a vector comprising the filter b and the equalizer taps w. The computations that follow require solving an eigenvalue problem for a matrix whose dimensions are (m+v) by (m+v), where m is the number of taps in the equalizer, and v the length of the time region allowed for the response region (in DMT systems v is the cyclic prefix+1). This eigenvalue problem is solved for each possible delay, and after performing the computation for all possible delays the global minimum is chosen.

Some straightforward manipulations transform the problem from an (m+v) by (m+v) size eigenvalue problem to a v by v size problem by performing a matrix inversion and multiplication of matrices of sizes m by m and m by v at each stage, and, moreover, by introducing division at each stage.

In the first approach 1) described above, each iteration of step b) requires the formation of two new matrices and the performing of a matrix inversion, usually leading to an enormous number of calculations for each $\Delta$ tried.

The second approach 2) greatly relaxes the computation load by performing only one matrix inversion and solving one maximal eigenvalue problem for each $\Delta$. However, as stated above, the matrices involved are still quite large, and even after simplification methods are used a matrix inversion of size m by m must be performed at each stage. The formation of a v by v size matrix at each step involves computations with larger size m by m matrices if v<=m, and an eigenvalue problem of size v by v (or perhaps a generalized eigenvalue problem) must be solved, which is very inefficient where v>m.

Relevant methods useful in equalization are discussed in "Fundamentals of Matrix Computations" by D. S. Watkins, John Wiley & Sons, 1991.

U.S. Pat. No. 5,285,474 is also believed to be representative of the art.

The disclosures of all U.S. Patents and publications mentioned in this specification and of U.S. patents and publications cited therein are hereby incorporated by reference.

SUMMARY OF THE INVENTION

The present invention seeks to provide novel apparatus and methods for determining equalizer coefficients which overcomes disadvantages of the prior art as discussed above. Other objects and advantages of the invention will become apparent from the description and claims which follow taken together with the appended drawings.

In accordance with the present invention there is provided a method for calculating a vector A from a set comprising at least one pair of subspaces of $R^N$ wherein N is the dimension of said vector space, each of the at least one pair comprises a first subspace and a second subspace of the vector space $R^N$, and a set of maximal projections and their corresponding unit vectors, each of said maximal projections is associated with one of the pairs of subspaces, wherein for each of the pairs of subspaces the first subspace is the column space of a N by m matrix M and the second subspace is a function of a predefined set of indices between 1 and N, comprising:

for each of the pairs of subspaces:
  determining a unit vector C in one of said subspaces so that a projection of the unit vector upon another of the vector subspaces is maximal for all unit vectors in one of the vector subspaces;

applying a predefined optimizing function to the set of maximal projections and unit vectors, thereby selecting a maximal projection and its corresponding unit vector and pair of first and second subspaces;

determining a vector A having length m, so that the product of vector A and matrix M is a unit vector B and the projection of B upon second subspace in the pair corresponding to said selected maximal projection is equal to the selected maximal projection.

The present invention further provides a method which adapts the computations to be performed according to the input data for the equalizing problem. The method includes generating a digital training signal and sending it through a channel, estimating the channel impulse response using the input and received signal and forming an approximation matrix, computing an orthonormal basis for the columns of the approximation matrix, and finding the projection of the vector space generated by this basis on the response region or finding the projection of the response region on the vector space generated by the columns of the approximation matrix. As will be used hereinafter the term approximation matrix will be used to denote a matrix M, whose product with any vector $(x_1, x_2, x_3, \ldots, x_m)^T$ of length m, is an approximation to the channel's response to a mT duration input digital signal, where T is the sampling period of the digital signal, and the values of the signal at times T, 2T, ..., mT, are equal to $x_1, x_2, x_3, \ldots, x_m$ respectively.

The term "response region" will be used hereinafter to denote a subspace of $R^N$ which coordinates other than in a predefined set of indices, are equal to zero. Typically, the predefined set of indices will comprise v=cyclic prefix+1 consecutive integers.

The term "maximal projection" used in conjunction with projection of one subspace of $R^N$ upon another subspace of $R^N$ will be used hereinafter to denote the maximal scalar product obtained from multiplying two unit vectors, one from each of the two subspaces.

Choosing which projection to perform depends on the dimensions of the vector spaces involved. Thus, when v<=m, computations for an eigenvalue problem of size v by v are performed, and where v>m, computations for an eigenvalue problem of size m by m are performed. The methods of the present invention are suited to be implemented either by a programmable DSP, a dedicated ASIC, or a general purpose computer. Finally, a set of equalizer coefficients is generated.

In accordance with a preferred embodiment of the present invention, the step of determining a unit vector C in the method provided, comprises:

forming matrices Q and R from an orthonormal basis to the column space of said matrix M wherein Q has the same dimensions as M, wherein the columns of Q are orthonormal, and wherein either of Q=MR and QR=M are true;

generating the unit vector C in the first subspace, wherein the unit vector is associated with a maximal projection upon the second subspace; and determining the maximum projection from the unit vector C.

More preferably, in the method provided, the step of determining a vector A comprises generating vector A by:

determining a vector of coordinates of the unit vector C associated with a basis which elements are equal to the columns of Q; and multiplying the vector of coordinates of the unit vector C by the matrix R where Q=MR and by $R^{-1}$ where QR=M.

According to another embodiment of the present invention, the step of determining a unit vector C step in the method provided, comprises:

forming matrices Q and R from an orthonormal basis to the column space of said matrix M wherein Q has the same dimensions as M, wherein the columns of Q are orthonormal, and wherein either of Q=MR and QR=M are true;

generating said unit vector C in said second subspace, second subspace being the subspace of $R^N$ whose coordinate values other than in said predefined set of indices are zero, wherein said unit vector is associated with a maximal projection upon said first subspace; and determining said maximum projection from said unit vector C.

More preferably, the step of determining vector A comprises generating the vector by:

determining a vector of coordinates of the unit vector C associated with a standard basis of said second subspace; and multiplying the vector of coordinates of the unit vector C by $RQ_A^T$ where Q=MR and by $R^{-1}Q_A^T$ where QR=M, where $Q_A$ is a matrix comprising rows of Q corresponding to the predefined set of indices and normalizing the result thus obtained to a unit vector.

Additionally in accordance with a preferred embodiment of the present invention the forming matrices step of the method provided, includes forming matrices Q and R by using Gram-Schmidt orthogonalization.

Moreover in accordance with yet another preferred embodiment of the present invention the forming matrices step of the method provided, includes forming matrices Q and R by using QR decomposition.

According to another aspect of present invention, there is provided a method for optimizing an equalizer in a data transmission system, where the equalizer is used to equalize a signal transmitted through a distorting channel. This method comprises the steps of:

transmitting a known training signal through the distorting channel;

generating a replica of the known training signal;

generating an N by m approximation matrix M from the output of the transmitted signal and the replica of the known training signal;

for each delay in a predefined range of delays:

generating a pair of a first subspace and a second subspace of a vector space $R^N$, the first subspace is the column space of said matrix M and the second subspace being a function of said delay is the subspace of $R^N$ whose coordinates other than in a predefined set of that delay are zero, comprising:

for each of the pair of subspaces:

determining a unit vector C in one of said subspaces so that a projection of the unit vector upon another of said vector subspaces is maximal for all unit vectors in one of the vector subspaces;

applying a predefined optimizing function to the set of maximal projections and unit vectors, thereby selecting a maximal projection and its corresponding unit vector and pair of first and second subspaces;

determining a vector A having length m, characterized in that its product with matrix M is a unit vector B and the projection of B upon the second subspace in the pair corresponding to the selected maximal projection is equal to the selected maximal projection; and setting vector A or any scalar multiplication thereof, to be the vector of equalizer coefficients, thereby optimizing the equalizer.

According to still another aspect of the present invention there is provided a system operative in calculating a vector A from a set comprising at least one pair of subspaces of $R^N$, each of said at least one pair comprises a first subspace and a second subspace of a vector space $R^N$, and a set of maximal projections and their corresponding unit vectors, each of said maximal projection is associated with one of said pair of subspaces, wherein N is the dimension of said vector space, and wherein for each of said pair of subspaces, said first subspace is the column space of a N by m matrix M and said second subspace is a function of a predefined set of indices between 1 and N, comprising:

apparatus operative for each of said pair of subspaces for determining a unit vector C in one of said subspaces so that a projection of said unit vector upon another of said vector subspaces is maximal for all unit vectors in said one of said vector subspaces;

apparatus for applying a predefined optimizing function to said set of maximal projections and unit vectors, thereby selecting a maximal projection and its corresponding unit vector and pair of first and second subspaces; and apparatus for determining a vector A having length m, characterized in that the product of said vector A and matrix M is a unit vector B and the projection of B upon second subspace in the pair corresponding to said selected maximal projection is equal to said selected maximal projection.

By a preferred embodiment of the invention, there is provided a system for equalizing a signal transmitted through a distorting channel and comprising:

a signal receiver operative to receive an output of a known training signal of data bits transmitted through said channel;

a generator operative to generate a replica of the known training signal;

an approximation matrix generator operative to generate an approximation matrix M from said output of the known training signal and said replica of said training signal;

a generator operative to generate for each delay in a predefined range of delays a pair of a first subspace and a second subspace of a vector space $R^N$, the first subspace is the column space of matrix M and the second subspace being a function of the delay is the subspace of $R^N$ whose coordinates other than in a predefined set of that delay are zero, by determining for each of the pair of subspaces a unit vector C in one of the subspaces, where the unit vector C is characterized in that a projection of the unit vector upon another of the vector subspaces is maximal for all unit vectors in one of the vector subspaces;

apparatus for applying a predefined optimizing function to the set of maximal projections and unit vectors, thereby selecting a maximal projection and its corresponding unit vector and pair of first and second subspaces;

apparatus for determining a vector A having length m, so that its product with matrix M is a unit vector B and the projection of B upon second subspace in the pair corresponding to the selected maximal projection is equal to the selected maximal projection; and apparatus for setting vector A to be the vector of equalizer coefficients, thereby optimizing the equalizing of the signal transmitted through said distorting channel.

Furthermore, the system provided may also include a transmitter operative to transmit the known training signal through the distorting channel.

BRIEF DESCRIPTION OF THE DRAWINGS

The present invention will be understood and appreciated from the following detailed description, taken in conjunction with the drawings in which.

DETAILED DESCRIPTION OF THE INVENTION

The present invention is based on the observation that the energy of the overall channel in any response region is bounded by the projection of the vector space generated by the columns of the approximation matrix upon the response region, and that there exist parameters for which this maximum can be obtained.

Figure 1:
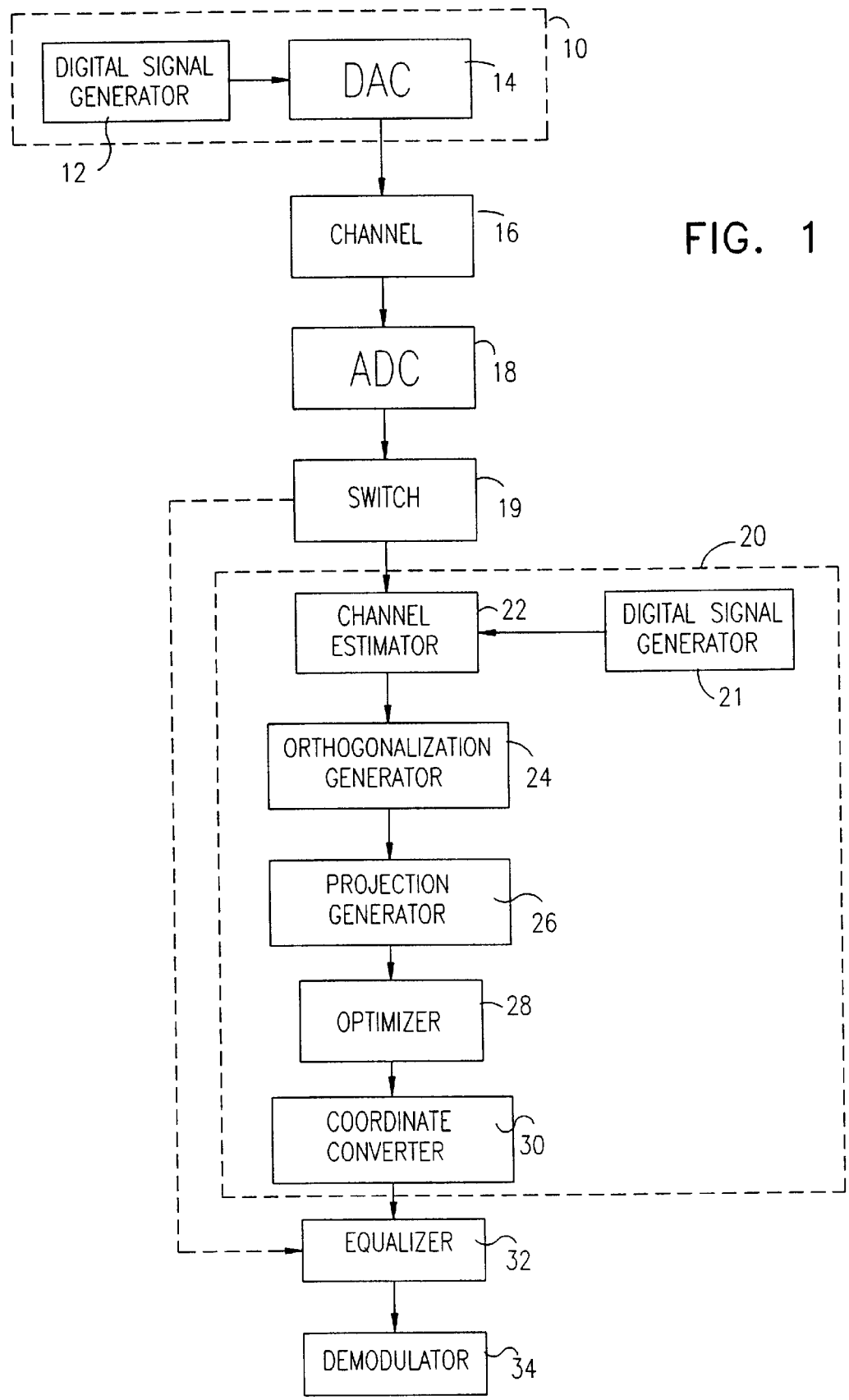
FIG. 1 is a simplified block diagram illustration of a signal equalization system constructed and operative in accordance with a preferred embodiment of the present invention.

Reference is now made to FIG. 1 which is a simplified block diagram illustration of a signal equalization system constructed and operative in accordance with a preferred embodiment of the present invention. FIG. 1 shows a modulator 10 which typically includes a digital signal generator 12 which generates a digital signal and a DAC 14 which performs digital to analog conversion. The modulator 10 transmits the modulated analog signal via a channel 16 to an ADC 18 where the signal is converted from an analog to a digital signal. ADC 18 is preferably connected by a switch 19 to equalizer initialization apparatus 20 and to an equalizer 32. During initialization, the switch 19 typically connects ADC 18 to the equalization initialization apparatus 20 which initializes equalizer 32. Once the equalizer 32 has been initialized, the switch 19 is typically set so that the ADC 18 is connected to equalizer 32. Signals equalized at equalizer 32 are demodulated at a demodulator 34. At anytime during operation of the signal equalization system shown in FIG. 1, the modulator 10 may be reconnected to equalizer initialization apparatus 20 to reinitialize equalizer 32 such as, for example, after a predetermined number or type of transmission errors are detected.

Equalizer initialization apparatus 20 typically includes a digital signal generator 21 which is connected to a channel estimator 22 which also receives the digital signal output from ADC 18 during initialization. Channel estimator 22 performs an estimation of the impulse response of the channel 16 and computes the approximation matrix. Orthogonalization apparatus 24 computes an orthonormal basis for the column space of the approximation matrix. A projection generator 26 computes the maximal projection between the column space of the approximation matrix and a subspace of $R^N$, whose coordinates are zero outside a specified region. An optimizer 28 compares the results with previous results and chooses the optimal of all the projections considered. A coordinate converter 30 converts the results to the coordinate system determined by the columns of the approximation matrix.

Equalizer initialization apparatus 20 may be implemented using one or more digital signal processor (DSP) chips such as the DSP563xx family manufactured by Motorola, Inc. The number of DSP chips used to implement equalizer initialization apparatus 20 depends primarily upon processing speed considerations.

The operation of the system of FIG. 1 is now described in greater detail. The digital signal generator 12 typically generates a predetermined training signal. The DAC 14 prepares the training signal from the digital signal generator 12 for transmission through channel 16. Once the channel output signal is received, the ADC 18 converts the signal into a digitized received signal.

The digital signal generator 21 generates a replica of the training signal generated by digital signal generator 12. Both the received signal and the replica of the training signal are input into channel estimator 22. Channel estimator 22 generates the required approximation matrix using the received signal and the local replica of the training signal.

The approximation matrix is then processed by orthogonalization apparatus 24 where two matrices Q and R are formed, Q with orthonormal columns and R which is upper diagonal. Several known methods may be used to form matrices Q and R, including, but not limited to, QR decomposition and the Gram-Schmidt orthogonalization algorithm.

The matrix Q is processed by projection generator 26 where only v rows of Q, denoted $Q_A$, are considered. A square matrix $Q_A^T Q_A$ is generated if v>=m, where m denotes the number of columns of Q, or a square matrix $Q_A Q_A^T$ is generated if v<m. A maximal projection is computed by computing a unit vector associated with the maximal eigenvalue of the matrix generated above.

The maximal projection is then processed by optimizer 28 where it is compared with previous projections and stored in case the current projection is more optimal than any previously stored projection.

Finally, the optimal projection and its associated unit vector stored at the optimizer 28 are processed by coordinate converter 30 where they are multiplied by an appropriate matrix to generate control parameters (taps) defining the filter which performs as equalizer 32.

The equalizer 32 may be implemented using an equalizer chip such as the DSP56301 chip manufactured by Motorola, Inc.

Figure 2A:
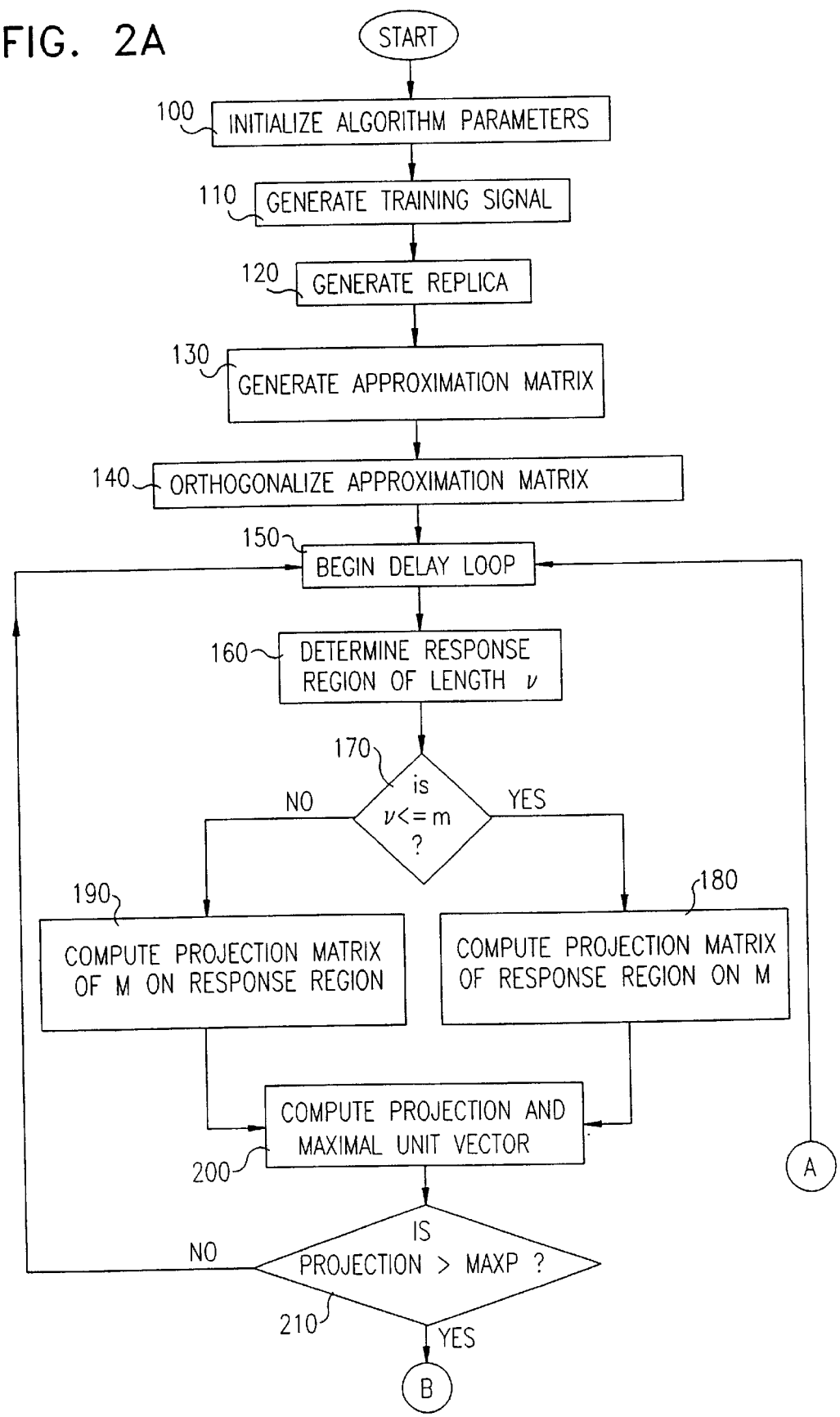
FIGS. 2A and 2B, taken together, are simplified flowchart illustrations of a preferred method of operation of the system of FIG. 1.
Figure 2B:
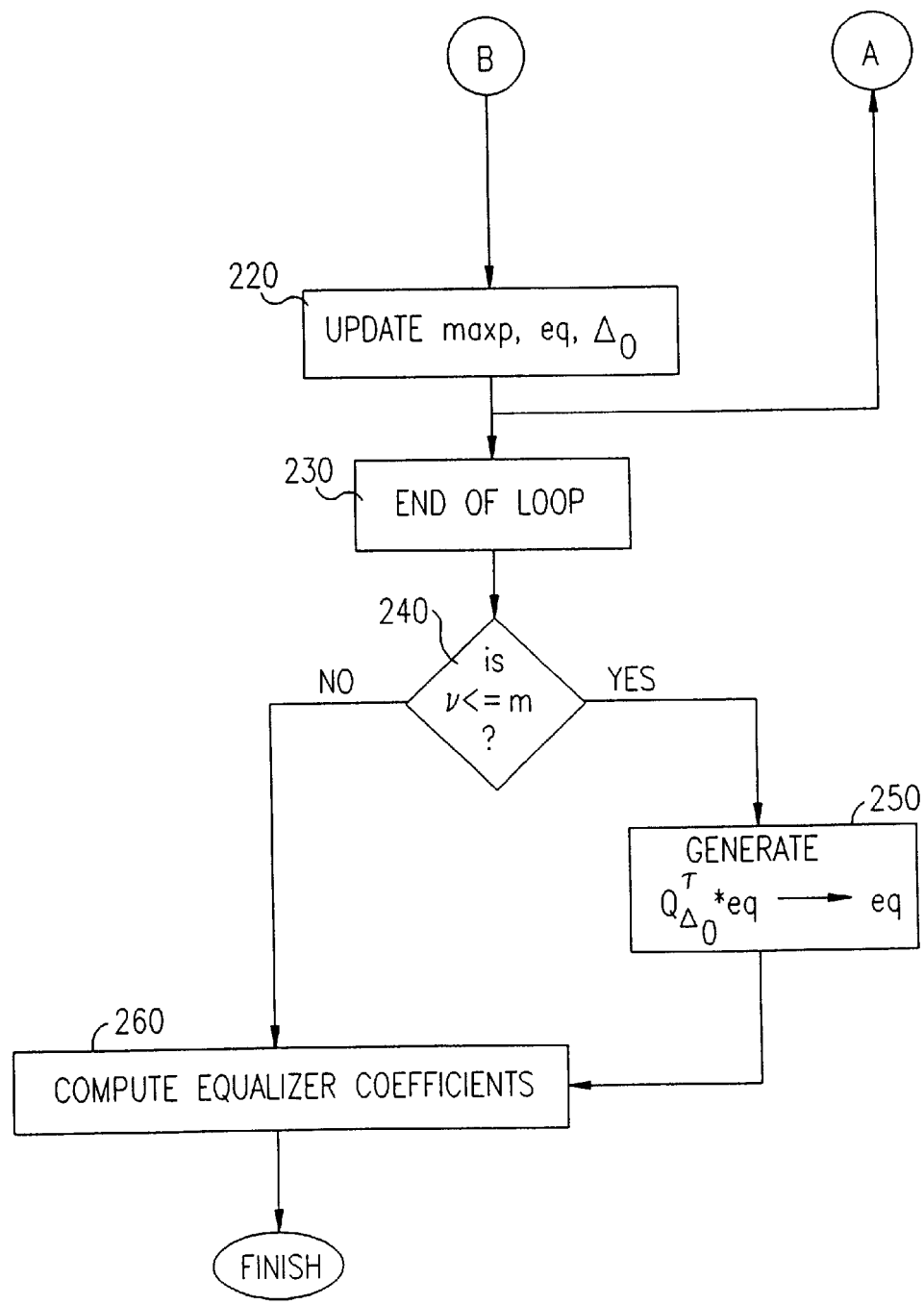

The system of FIG. 1 is now described in greater detail with additional reference to FIGS. 2A and 2B which, taken together, are simplified flowchart illustrations of a preferred method of operation of the system of FIG. 1, particularly of equalizer initialization apparatus 20.

In steps 100, 110, 120, and 130 an estimation of the impulse response of the channel 16 is created, and an approximation matrix M is generated.

At 100 the algorithm parameters are initialized: The size of the target window v, the number of equalizer taps m, and the length of the impulse response N, are set. A maximal projection, maxp, is initialized to be 0, and variables are assigned for the equalizer taps eq, and for the delay of the system $\Delta_0$.

A known training signal of data bits is generated by the digital signal generator 12, transmitted over the channel 16, and received by the ADC 18 (step 110). A replica of the known training signal is generated by digital signal generator 21 (step 120).

The relationship between the signal received by ADC 18 and the local replica generated by digital signal generator 21 is used to generate an estimate of the impulse response of the channel, H. This estimate is in turn used to generate by techniques known in the art per se, a matrix M such that for all equalizer taps w, the overall response of the equalized channel will be approximated by the product of matrix and vector, Mw. An example of such a procedure when the input signal x comprises independent standard gausian distributed samples, is that the approximation is made by substituting the cross-correlation matrix $R_{x,y}$ for M (step 130). M is preferably of size N by m, where N is the length of the impulse response, and m, the number of equalizer coefficients. This is done by the channel estimator 22.

The expression Mw may be viewed as a linear combination of the columns of M. The portion of this response which corresponds to any vector subspace V of $R^N$ is bounded from above by the projection of the column space of M on that subspace. This may be computed by determining a unit vector in the column space of M where a projection of the unit vector upon V is maximal for all unit vectors in the column space of M. Alternatively, the projection of V on the column space of M may be computed by determining a unit vector in V where a projection of the unit vector upon the column space of M is maximal for all unit vectors in V.

In particular, regarding the subspace which includes the samples d+1 to d+v, the energy of the signal in that region is bounded by the projection of the column space of M on the subspace of $R^N$ which is 0 outside a window of size v. This is a symmetric problem that may be solved by computing the projection of the latter subspace on the column space of M. Which computation to perform may be chosen by the minimum of the dimensions of the above subspaces as follows: If v is less than or equal the dimension of the column space of M, then the preferred computation is to compute the projection of the sub vector space of $R^N$ which is 0 outside a window of size v on the column space of M. Otherwise, compute the projection of the column space of M on the sub vector space of $R^N$ which is 0 outside a window of size v.

Viewing the problem as a projection of vector spaces, the natural inclination is to convert to orthonormal bases for each of the subspaces. Thus, after generating the approximation matrix corresponding to the impulse response of the channel, the following steps may be performed:

1. Generate an orthonormal basis for the columns of the approximation matrix M (step 140) using any known method. This may be done for example by applying the Gram-Schmidt algorithm, or by performing a QR decomposition of the approximation matrix, but in the case of QR decomposition the computation is limited to the first m columns of Q. Step 140 is typically performed by the orthogonalization generator 24. Two matrices Q and R are generated where the columns of Q are orthonormal, the matrix R is upper diagonal, and they satisfy either Q=MR (typical for Gram Schmidt algorithm), or M=QR (typical for QR decomposition).

Several known approaches may be used to perform either the Gram-Schmidt algorithm or the QR decomposition. While detailed explanations of the application of the Gram-Schmidt algorithm and QR decomposition are presented hereinbelow by way of example, it is appreciated that any of several well known variants to these algorithms may be used and still remain within the spirit and scope of the present invention.

2. A processing loop begins at step 150. The calculation extends from the minimal delay to be considered (denoted dmin) to the maximal delay to be considered (denoted dam). If v<=m, then for every delay $\Delta$ compute the projection of the response region $\Delta+1$ to $\Delta+v$ on the column space of Q (which is the same as the column space of M). If v>m, then compute the projection of the column space of Q on the response region $\Delta+1$ to $\Delta+v$. It is appreciated that the two projections are equivalent.

Denoting the v rows of Q from $\Delta+1$ to $\Delta+v$ by $Q_A$ (step 160):

a) If v<=m, generate the matrix $Q_A Q_A^T$ (step 180), otherwise generate the matrix $Q_A^T Q_A$ (step 190).

b) Generate the unit vector associated with the maximal projection of all unit vectors in one of the above subspaces upon the other (the projection of the response region $\Delta+1$ to $\Delta+v$ upon the column space of Q in case v<=m, or the projection of the column space of Q upon the response region $\Delta+1$ to $\Delta+v$ in case v>m). This may be achieved by computing the unit eigenvector associated with the maximal eigenvalue of the above matrix. The computation of the eigenvector may be carried out for example by using methods known in the art per se such as using the power method algorithm (step 200). As should be understood by the man skilled in the art, the unit vector referred above may be identified by its vector of coordinates (in the present example the eigenvector) rather than using the vector itself, once it is clear which basis is associated with the coordinates.

c) Compute the maximal eigenvalue of the matrix (step 200). This eigenvalue is the norm of the projection between the two subspaces mentioned above. Steps a), b), and c) are typically performed by the projection generator 26.

An explanation of steps a)–c) is now provided. Since the columns of Q are orthonormal, finding a unit vector in the column space of Q is equivalent to finding a unit vector in $R^m$, since for any unit vector w in $R^m$, Qw is a unit vector in the column space of Q. The vector w is the "vector of coordinates" (or the "coordinate vector") of Qw, relative to the basis containing the columns of Q as basis elements. As known in the art, once a basis is determined, a vector can be identified by its vector of coordinates. The non-zero portion of the projection of Qw on the response region defined above is $Q_A w$, and thus the square of the norm of the projection is $w^T Q_A^T Q_A w$. $Q_A^T Q_A$ is a symmetric matrix, thus it has an orthonormal basis of eigenvectors with real eigenvalues, thus it is easy to see that the maximal projection will be achieved by a maximal eigenvector of $Q_A^T Q_A$ and the square of the norm of the projection will be the maximal eigenvalue.

Alternatively, one may choose a unit vector x in the response region and compute its projection upon the column space of Q. The vector of coordinates of the projection of x upon the column space of Q, (the scalar products between x and the columns of Q), will be given by $Q_A^T \tilde{x}$, where $\tilde{x}$ is the portion of x, containing the coordinates from $\Delta+1$ to $\Delta+v$. $\tilde{x}$ is readily seen to be the vector of coordinates of x relative to the basis of the response region containing standard unit vectors of $R^N$ as its elements. (i.e the first basis element is a unit vector of $R^N$ having 1 in the $\Delta+1$ coordinate and the last basis element is a unit vector of $R^N$ having 1 in the $\Delta+v$ coordinate). Given the above explanation it is easy to see that the maximal projection may be computed from the maximal unit eigenvector and the associated eigenvalue of the matrix $Q_A Q_A^T$.

Step 2 may easily be generalized to a situation where the response region is the subspace of $R^N$ whose coordinates are zero outside any predefined set of indices. For example, if the predefined set of indices is the set $\{1,3,7\}$, then $Q_A$ may be defined to be the matrix which includes of rows 1,3,7 of Q.

In greater generality, for every matrix in U in $R^N$ comprising orthonormal columns, the projection from $R^N$ to the column space of U is given by $UU^T$. In case of the above response region it is easy to see that an orthonormal matrix U whose column space is the response region is a matrix comprising v standard unit vectors of $R^N$, wherein the first column has 1 in coordinate $\Delta+1$, and 0 otherwise and the last column has 1 in coordinate $\Delta+v$, and 0 otherwise.

The projection of a vector in the column space of Q upon the response region may be written as $UU^T Qw$ where w is a unit vector in $R^m$. The square norm of such the projection is $w^T Q^T UU^T UU^T Qw = w^T Q^T UU^T Qw$. To find a maximal projection we must thus find a maximal eigenvalue of $Q^T UU^T Q$. It is easily seen that in our case $Q^T U = Q_A^T$, and $U^T Q = Q_A$, thus in order to find the maximal projection from the column space of Q upon the response region we must find the maximal eigenvalue of $Q_A^T Q_A$, and similarly in order to find the maximal projection of the response region upon the column space of Q, the maximal eigenvalue of $U^T QQ^T U = Q_A Q_A^T$ must be computed.

The complexity of the computation varies between the cases v<=m and v>m, as is now explained.

In the case where v<=m, generating $Q_A Q_A^T$ requires approximately $mv^2$ operations for $\Delta$=dmin, and passing from $\Delta$ to $\Delta+1$ requires an additional mv operations. This is because the elements of $Q_A Q_A^T$ are scalar products of the rows of $Q_A$, and when shifting from $\Delta$ to $\Delta+1$ a new row is introduced for which v new scalar products must be computed, each of them requiring approximately m operations.

In the case where v>m, computing $Q_A^T Q_A$ requires approximately $m^2 v$ operations for $\Delta$=dmin, but passing from $\Delta$ to $\Delta+1$ only requires an additional $m^2$ operations. This is because the elements of $Q_A^T Q_A$ are scalar product of the columns of $Q_A$, and when shifting from $\Delta$ to $\Delta+1$ a new row is introduced. Thus, in every column only two changes were made, and, therefore, each element needs two operations to fix its value. This is done for $m^2$ elements.

3. Perform a control loop operation to determine the necessity in replacing parameters maxp, $\Delta_0$, and eq.

One example of such simple control loop is the following:

Compare the maximal projection with the maximal projection from previous delays, maxp (step 210).

If the present projection is greater than the stored maximal projection maxp, then replace maxp with the present projection, store the current delay $\Delta$ in $\Delta_0$, and store the associated unit vector (or its vector of coordinates) in eq. (step 220). Steps 210 and 220 are typically performed by the optimizer 28.

Another example of a control loop which might be applicable is to evaluate the Discrete Fourier Transform (DFT) of the unit vector associated with the maximal projection, compute its logarithm over a predefined range, take the sum of the absolute values of the logarithms, multiply by the maximal projection and compare the result with the same operations performed on the stored parameters, and then decide whether these parameters are to be changed.

4. After finding the optimal projection the results are sent to the coordinate converter 30, where the equalization coefficients are computed by first computing $Q_{\Delta_0}{}^T eq \rightarrow eq$ if v<=m. (step 250), and then performing Req→eq (step 260) for $\Delta_0$, and eq. This is true where the matrices Q,R,M generated by orthogonalization apparatus 24 satisfy the equation Q=MR (as might be the case where the Gram-Schmidt algorithm is used). If the matrices Q,R,M generated by orthogonalization apparatus 24 satisfy M=QR (as might be the case where QR decomposition is used) then $R^{-1}eq \rightarrow eq$ should be performed at step 260 instead of Req→eq.

It is appreciated that step 4 need only be performed once at the end of the loop where the delay and unit vector corresponding to the global maximal projection are stored. At intermediate steps only the maximal projection, the corresponding coordinate vector, and the delay need be stored.

The Gram-Schmidt orthogonalization algorithm is well known in the art, and its variants are fully described in many basic textbooks on linear algebra such as in Watkins, pp. 167–182. Purely by way of example one variant of the algorithm is now described.

Given a matrix A of order n by m, compute a matrix Q of the same order and an upper diagonal matrix R such that the columns of Q are orthonormal, and AR=Q as follows:
1. Initialize Q=A and R=$I_{m \times m}$.
2. for ii=1 to m
    normalize the $ii^{th}$ column of Q.
    multiply the $ii^{th}$ column of R by the normalization factor.
3. for j=ii+1 to m
    compute the scalar product $\alpha$, of the $ii^{th}$ column of Q and the $j^{th}$ column of Q
    subtract $\alpha$ times the $ii^{th}$ columns of Q from the $j^{th}$ column of Q.
    subtract $\alpha$ times the $ii^{th}$ columns of R from the $j^{th}$ column of R.

QR decomposition techniques are also well known. QR decomposition is typically carried out in such a manner that initially the R matrix is computed along with a sequence of basic rotators or reflectors from which the matrix Q is assembled. In the present example the construction of the Q matrix may be done by applying the rotators or reflectors to the first m columns of the identity matrix of size N by N, such as is described in Watkins, pp. 136–158.

A description of an application of QR decomposition is now presented by way of example. Given a matrix A of order n by m and assumed to have full rank, compute a matrix Q of the same order and an upper diagonal matrix R such that the columns of Q are orthonormal, and A=QR.

1. Let x denote the first column of A.
    Find a vector y where all coordinates are 0 except for the first, and a reflector matrix $Q_1$ such that $Q_1 x = y$.
2. Apply $Q_1$ to A to form a matrix (denoted $A_1$), whose first column is zero except for the first row.
3. Next, ignore the first row and first column of $A_1$ and, by abuse of notation, continue to denote the reduced matrix by $A_1$, and repeat the same process (i.e. steps 1 and 2) for the reduced matrix $A_1$, to obtain a matrix $A_2$ and a reflector $Q_2$. The matrix $A_2$ is of order n−2 by m−2, and the reflector $Q_2$ acts on $R^{n-1}$.
4. Extend $Q_2$ to a reflector acting on $R^n$ by acting as the identity on the first coordinate of $R^n$ and, by abuse of notation, continue to denote the new reflector by $Q_2$.
5. Repeat the process (steps 1–4) m times and obtain a sequence of reflectors $Q_1, Q_2, \ldots, Q_m$, such that $Q_m Q_{m-1} \ldots Q_1 A = R$, where the first m rows of R form an upper diagonal matrix $R_1$, and the last n−m rows of R are 0.
5. Apply $Q_1 Q_2 \ldots Q_m$ from the left to the first m columns of the n by n identity matrix denoted by $I_{n,m}$, and obtain Q. A preferred way to carry out this computation is to compute first $B_m = Q_m I_{n,m}$, next compute $B_{m-1} = Q_{m-1} B_m$, etc. down to $Q = B_1 = Q_1 B_2$.
6. By abuse of notation denote by R the first m rows of R and obtain the result.

The power method is well known in the art as a method for computing the largest eigenvector of a matrix and is described in Watkins, pp. 210–224 and in U.S. Pat. No. 5,461,640 as well. It should be noted, however, that while computing via the power method one must be careful to avoid overflows or underflows. This may require normalization of the vectors involved at each stage and performing multiplication or division. This multiplication or division may be carried by applying shifts, without affecting the simplicity of the process. Thus, the only place where division is performed is when the eigenvalue is computed from the known eigenvector.

It is appreciated that the steps of FIGS. 2A and 2B need not necessarily be performed in the order shown, and that in fact different implementations of the steps of FIGS. 2A and 2B may be employed to yield similar overall results.

It is appreciated that any of the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A method for calculating a vector A from a set comprising at least one pair of subspaces of $R^N$ wherein N is the dimension of said vector space, each of said at least one pair comprises a first subspace and a second sub space of the vector space $R^N$, and a set of maximal projections and their corresponding unit vectors, each of said maximal projections is associated with one of said pairs of subspaces, wherein for each of said pairs of subspaces said first subspace is the column space of a N by m matrix M and said second subspace is a function of a predefined set of indices between 1 and N, comprising:

for each of said pairs of subspaces:
determining a unit vector C in one of said subspaces so that a projection of
said unit vector upon another of said vector subspaces is maximal for all unit
vectors in said one of said vector subspaces;
applying a predefined optimizing function to said set of maximal projections and unit vectors, thereby selecting a maximal projection and its corresponding unit vector and pair of first and second subspaces;
determining a vector A having length m, so that the product of said vector A and matrix M is a unit vector B and the projection of B upon second subspace in the pair corresponding to said selected maximal projection is equal to said selected maximal projection.

2. A method according to claim 1 wherein said determining a unit vector C step comprises:
forming matrices Q and R from an orthonormal basis to the column space of said matrix M wherein Q has the same dimensions as M, wherein the columns of Q are orthonormal, and wherein either of Q=MR and QR=M are true;
generating said unit vector C in said first subspace, wherein said unit vector is associated with a maximal projection upon said second subspace; and
determining said maximum projection from said unit vector C.

3. A method according to claim 2, wherein said determining a vector A step comprises generating said vector A by:
determining a vector of coordinates of said unit vector C associated with a basis which elements are equal to the columns of Q; and
multiplying said vector of coordinates of said unit vector C by said matrix R where Q=MR and by $R^{-1}$ where QR=M.

4. A method according to claim 2 wherein said forming matrices step comprises forming matrices Q and R using Gram-Schmidt orthogonalization.

5. A method according to claim 2 wherein said forming matrices step comprises forming matrices Q and R using QR decomposition.

6. A method according to claim 1 wherein said function of predefined indices is being equal to zero for coordinates other than in said set of indices.

7. A method according to claim 1, wherein said determining a unit vector C step comprises:
forming matrices Q and R from an orthonormal basis to the column space of said matrix M wherein Q has the same dimensions as M, wherein the columns of Q are orthonormal, and wherein either of Q=MR and QR=M are true;
generating said unit vector C in said second subspace, said second subspace being the subspace of $R^N$ whose coordinate values other than in said predefined set of indices are zero, wherein said unit vector is associated with a maximal projection upon said first subspace; and
determining said maximum projection from said unit vector C.

8. A method according to claim 7, wherein said determining a vector A step comprises generating said vector A by:
determining a vector of coordinates of said unit vector C associated with a standard basis of said second subspace; and
multiplying said vector of coordinates of said unit vector C by $RQ_A^T$ where Q=MR and by $R^{-1}Q_A^T$ where QR=M, where $Q_A$ is a matrix comprising rows of Q corresponding to said predefined set of indices and normalizing the result thus obtained to a unit vector.

9. A method, in a data transmission system, for optimizing an equalizer, said equalizer used to equalize a signal transmitted through a distorting channel, comprising the steps of:
transmitting a known training signal through said channel;
generating a replica of said training signal;
generating an N by m approximation matrix M from the output of said transmitted signal and said replica of said training signal;
for each delay in a predefined range of delays:
generating a pair of a first subspace and a second subspace of a vector space $R^N$, said first subspace is the column space of said matrix M and said second subspace being a function of said delay is the subspace of $R^N$ whose coordinates other than in a predefined set of that delay are zero, comprising:
for each of said pair of subspaces:
determining a unit vector C in one of said subspaces so that a projection of said unit vector upon another of said vector subspaces is maximal for all unit vectors in said one of said vector subspaces;
applying a predefined optimizing function to said set of maximal projections and unit vectors, thereby selecting a maximal projection and its corresponding unit vector and pair of first and second subspaces;
determining a vector A having length m, characterized in that the product of said vector A and matrix M is a unit vector B and the projection of B upon second subspace in the pair corresponding to said selected maximal projection is equal to said selected maximal projection; and
setting vector A or any scalar multiplication thereof, to be the vector of equalizer coefficients, thereby optimizing said equalizer.

10. A method according to claim 9, wherein the determining of said unit vector C comprises the determination of its coordinate vector by:
forming matrices Q and R from an orthonormal basis to the column space of said matrix M wherein Q has the same dimensions as M, wherein the columns of Q are orthonormal, and wherein either of Q=MR and QR=M are true;
generating a coordinate vector of said unit vector C where C being a unit vector in said first subspace, wherein said coordinate vector is associated with a basis which elements are equal to the columns of Q and wherein said coordinate vector is associated with a maximal projection of said first subspace upon said second subspace; and
determining said maximum projection from said coordinate vector.

11. A method according to claim 10, wherein said determining a vector A step comprises generating said vector A by multiplying said coordinate vector by said matrix R where Q=MR and by $R^{-1}$ where QR=M.

12. A method according to claim 9, wherein the determining of said unit vector C comprises the determination of its coordinate vector by:
forming matrices Q and R from an orthonormal basis to the column space of said matrix M wherein Q has the same dimensions as M, wherein the columns of Q are orthonormal, and wherein either of Q=MR and QR=M are true;

generating a coordinate vector of said unit vector C where C being a unit vector in said second subspace, wherein said coordinate vector is associated with a standard basis of said second subspace, and wherein said coordinate vector is associated with a maximal projection of said second subspace upon said first subspace; and determining said maximum projection from said coordinate vector.

13. A method according to claim 12, wherein said determining a vector A step comprises generating said vector A by multiplying said coordinate vector by $RQ_A^T$ where Q=MR and by $R^{-1}Q_A^T$ where QR=M, where $Q_A$ is a matrix comprising rows of Q corresponding to said predefined set of indices and normalizing the result thus obtained to a unit vector.

14. A system for equalizing a signal transmitted through a distorting channel and comprising:

a signal receiver operative to receive an output of a known training signal of data bits transmitted through said channel;

a generator operative to generate a replica of the known training signal;

an approximation matrix generator operative to generate an approximation matrix M from said output of the known training signal and said replica of said training signal;

a generator operative to generate for each delay in a predefined range of delays a pair of a first subspace and a second subspace of a vector space $R^N$, said first subspace is the column space of said matrix M and said second subspace being a function of said delay is the subspace of $R^N$ whose coordinates other than in a predefined set of that delay are zero, by determining for each of said pair of subspaces a unit vector C in one of said subspaces, where said unit vector C is characterized in that a projection of said unit vector upon another of said vector subspaces is maximal for all unit vectors in said one of said vector subspaces;

apparatus for applying a predefined optimizing function to said set of maximal projections and unit vectors, thereby selecting a maximal projection and its corresponding unit vector and pair of first and second subspaces;

apparatus for determining a vector A having length m, so that the product of said vector A and matrix M is a unit vector B and the projection of B upon second subspace in the pair corresponding to said selected maximal projection is equal to said selected maximal projection; and apparatus for setting vector A to be the vector of equalizer coefficients, thereby optimizing the equalization of said signal transmitted through said distorting channel.

15. A system according to claim 14, wherein said generator is operative to determine the coordinate vector of said unit vector C by:

forming matrices Q and R from an orthonormal basis to the column space of said matrix M wherein Q has the same dimensions as M, wherein the columns of Q are orthonormal, and wherein either of Q=MR and QR=M are true;

generating a coordinate vector of said unit vector C where C being a unit vector in said first subspace, wherein said coordinate vector is associated with a basis which elements are equal to the columns of Q and wherein said coordinate vector is associated with a maximal projection of said first subspace upon said second subspace; and determining said maximum projection from said coordinate vector.

16. A system according to claim 15, wherein said generator is operative in generating said vector A by multiplying said coordinates vector by said matrix R where Q=MR and by $R^{-1}$ where QR=M.

17. A system according to claim 15 wherein said forming matrices step comprises forming matrices Q and R using Gram-Schmidt orthogonalization.

18. A system according to claim 15 wherein said forming matrices step comprises forming matrices Q and R using QR decomposition.

19. A system according to claim 14, wherein said generator is operative to determine the coordinate vector of said unit vector C by:

forming matrices Q and R from an orthonormal basis to the column space of said matrix M wherein Q has the same dimensions as M, wherein the columns of Q are orthonormal, and wherein either of Q=MR and QR=M are true;

generating a coordinate vector of said unit vector C where C being a unit vector in said second subspace, wherein said coordinate vector is associated with a standard basis of said second subspace, and wherein said coordinate vector is associated with a maximal projection of said second subspace upon said first subspace; and determining said maximum projection from said coordinate vector.

20. A system according to claim 19, wherein said generator is operative in generating said vector A by multiplying said coordinate vector by $RQ_A^T$ where Q=MR and by $R^{-1}Q_A^T$ where QR=M where $Q_A$ is a matrix comprising rows of Q corresponding to said predefined set and normalizing the result thus obtained to a unit vector.

21. A system operative in calculating a vector A from a set comprising at least one pair of subspaces of $R^N$, each of said at least one pair comprises a first subspace and a second subspace of a vector space $R^N$, and a set of maximal projections and their corresponding unit vectors, each of said maximal projection is associated with one of said pair of subspaces, wherein N is the dimension of said vector space, and wherein for each of said pair of subspaces, said first subspace is the column space of a N by m matrix M and said second subspace is a function of a predefined set of indices between 1 and N, comprising:

apparatus operative for each of said pair of subspaces for determining a unit vector C in one of said subspaces so that a projection of said unit vector upon another of said vector subspaces is maximal for all unit vectors in said one of said vector subspaces;

apparatus for applying a predefined optimizing function to said set of maximal projections and unit vectors, thereby selecting a maximal projection and its corresponding unit vector and pair of first and second subspaces; and apparatus for determining a vector A having length m, characterized in that the product of said vector A and matrix M is a unit vector B and the projection of B upon second subspace in the pair corresponding to said selected maximal projection is equal to said selected maximal projection.

22. A method substantially as described and exemplified herein with reference to the drawings.

23. A system substantially as described herein with reference to the drawings.

* * * * *